US008306337B2

(12) United States Patent
Kirsch et al.

(10) Patent No.: US 8,306,337 B2
(45) Date of Patent: Nov. 6, 2012

(54) USE OF Z-ORDER DATA IN AN IMAGE SENSOR

(75) Inventors: Graham Kirsch, Hants (GB); Anthony Huggett, Basingstoke (GB)

(73) Assignee: Aptina Imaging Corporation, George Town, Grand Cayman (KY)

( * ) Notice: Subject to any disclaimer, the term of this patent is extended or adjusted under 35 U.S.C. 154(b) by 694 days.

(21) Appl. No.: 12/544,837

(22) Filed: Aug. 20, 2009

(65) Prior Publication Data

US 2010/0316254 A1 Dec. 16, 2010

(30) Foreign Application Priority Data

Jun. 16, 2009 (GB) .................................. 0910387.0

(51) Int. Cl.
*G06K 9/00* (2006.01)
(52) U.S. Cl. ....................................................... 382/224
(58) Field of Classification Search ........................ None
See application file for complete search history.

(56) References Cited

U.S. PATENT DOCUMENTS

| | | | | |
|---|---|---|---|---|
| 6,707,463 | B1* | 3/2004 | Gibson et al. | 345/619 |
| 7,974,343 | B2* | 7/2011 | Gao et al. | 375/240.12 |
| 8,031,261 | B2* | 10/2011 | Izawa et al. | 348/362 |
| 2010/0007769 | A1* | 1/2010 | Chiang | 348/231.99 |
| 2010/0054550 | A1* | 3/2010 | Okada | 382/118 |
| 2010/0201846 | A1* | 8/2010 | Silverbrook | 348/231.99 |

FOREIGN PATENT DOCUMENTS

| | | |
|---|---|---|
| WO | 2006001525 A1 | 1/2006 |
| WO | 2007140523 A1 | 12/2007 |

OTHER PUBLICATIONS

Artyomov et al., "Morton (Z) Scan Based Real-Time Variable Resolution CMOS Image Sensor" IEEE Transactions on Circuits and Systems for Video Technology, vol. 15, No. 7, pp. 145-148.
Yan et al., "The Practical Method of Fractal Dimensionality Reduction Based on Z-Ordering Technique" Advanced Data Mining and Applications, Second International Conference, 2006, pp. 542-549.
Julien Meynet, "Fast Face Detection Using AdsBoost" Technical Report, Jul. 16, 2003, pp. 1-94.
Yoav Freund and Robert E. Schapire, "A decision-theoretic generalization of on-line learning and an application to boosting" AT&T Bell Laboratories, Sep. 20, 1995, pp. 1-34.
Yoav Freund and Robert E. Schapire, "A Short Introduction to Boosting" Journal of Japanese Society for Artificial Intelligence, Sep. 1999, 14(5):771-780.

* cited by examiner

*Primary Examiner* — Vikkram Bali
(74) *Attorney, Agent, or Firm* — Kramer Levin Naftalis & Frankel LLP

(57) ABSTRACT

Systems and methods are provided for detecting objects of an object class, such as faces, in an image sensor. In some embodiments, the image sensor can include a detector with an image buffer. The image buffer can store image data in raster order. The detector can read the data out in Z order to perform object detection. The image data can then compute feature responses using the Z-ordered image data and determine whether any objects of the object class are present based on the feature responses. In some embodiments, the detector can downscale the image data while the object detection is performed and use the downscaled image data to continue the detection process. In some embodiments, the image data can perform detection even if the image is rotated.

28 Claims, 7 Drawing Sheets

UNROTATED (0°) — 802

| 00 | 01 | 04 | 05 | 10 | 11 | 14 | 15 | 40 | 41 | 44 | 45 | 50 | 51 | 54 | 55 |
|---|---|---|---|---|---|---|---|---|---|---|---|---|---|---|---|
| 02 | 03 | 06 | 07 | 12 | 13 | 16 | 17 | 42 | 43 | 46 | 47 | 52 | 53 | 56 | 57 |
| 08 | 09 | 0c | 0d | 18 | 19 | 1c | 1d | 48 | 49 | 4c | 4d | 58 | 59 | 5c | 5d |
| 0a | 0b | 0e | 0f | 1a | 1b | 1e | 1f | 4a | 4b | 4e | 4f | 5a | 5b | 5e | 5f |
| 20 | 21 | 24 | 25 | 30 | 31 | 34 | 35 | 60 | 61 | 64 | 65 | 70 | 71 | 74 | 75 |
| 22 | 23 | 26 | 27 | 32 | 33 | 36 | 37 | 62 | 63 | 66 | 67 | 72 | 73 | 76 | 77 |
| 28 | 29 | 2c | 2d | 38 | 39 | 3c | 3d | 68 | 69 | 6c | 6d | 78 | 79 | 7c | 7d |
| 2a | 2b | 2e | 2f | 3a | 3b | 3e | 3f | 6a | 6b | 6e | 6f | 7a | 7b | 7e | 7f |
| 80 | 81 | 84 | 85 | 90 | 91 | 94 | 95 | c0 | c1 | c4 | c5 | d0 | d1 | d4 | d5 |
| 82 | 83 | 86 | 87 | 92 | 93 | 96 | 97 | c2 | c3 | c6 | c7 | d2 | d3 | d6 | d7 |
| 88 | 89 | 8c | 8d | 98 | 99 | 9c | 9d | c8 | c9 | cc | cd | d8 | d9 | dc | dd |
| 8a | 8b | 8e | 8f | 9a | 9b | 9e | 9f | ca | cb | ce | cf | da | db | de | df |
| a0 | a1 | a4 | a5 | b0 | b1 | b4 | b5 | e0 | e1 | e4 | e5 | f0 | f1 | f4 | f5 |
| a2 | a3 | a6 | a7 | b2 | b3 | b6 | b7 | e2 | e3 | e6 | e7 | f2 | f3 | f6 | f7 |
| a8 | a9 | ac | ad | b8 | b9 | bc | bd | e8 | e9 | ec | ed | f8 | f9 | fc | fd |
| aa | ab | ae | af | ba | bb | be | bf | ea | eb | ee | ef | fa | fb | fe | ff |

ROTATED 180° — 806

| ff | fe | fb | fa | ef | ee | eb | ea | bf | be | bb | ba | af | ae | ab | aa |
|---|---|---|---|---|---|---|---|---|---|---|---|---|---|---|---|
| fd | fc | f9 | f8 | ed | ec | e9 | e8 | bd | bc | b9 | b8 | ad | ac | a9 | a8 |
| f7 | f6 | f3 | f2 | e7 | e6 | e3 | e2 | b7 | b6 | b3 | b2 | a7 | a6 | a3 | a2 |
| f5 | f4 | f1 | f0 | e5 | e4 | e1 | e0 | b5 | b4 | b1 | b0 | a5 | a4 | a1 | a0 |
| df | de | db | da | cf | ce | cb | ca | 9f | 9e | 9b | 9a | 8f | 8e | 8b | 8a |
| dd | dc | d9 | d8 | cd | cc | c9 | c8 | 9d | 9c | 99 | 98 | 8d | 8c | 89 | 88 |
| d7 | d6 | d3 | d2 | c7 | c6 | c3 | c2 | 97 | 96 | 93 | 92 | 87 | 86 | 83 | 82 |
| d5 | d4 | d1 | d0 | c5 | c4 | c1 | c0 | 95 | 94 | 91 | 90 | 85 | 84 | 81 | 80 |
| 7f | 7e | 7b | 7a | 6f | 6e | 6b | 6a | 3f | 3e | 3b | 3a | 2f | 2e | 2b | 2a |
| 7d | 7c | 79 | 78 | 6d | 6c | 69 | 68 | 3d | 3c | 39 | 38 | 2d | 2c | 29 | 28 |
| 77 | 76 | 73 | 72 | 67 | 66 | 63 | 62 | 37 | 36 | 33 | 32 | 27 | 26 | 23 | 22 |
| 75 | 74 | 71 | 70 | 65 | 64 | 61 | 60 | 35 | 34 | 31 | 30 | 25 | 24 | 21 | 20 |
| 5f | 5e | 5b | 5a | 4f | 4e | 4b | 4a | 1f | 1e | 1b | 1a | 0f | 0e | 0b | 0a |
| 5d | 5c | 59 | 58 | 4d | 4c | 49 | 48 | 1d | 1c | 19 | 18 | 0d | 0c | 09 | 08 |
| 57 | 56 | 53 | 52 | 47 | 46 | 43 | 42 | 17 | 16 | 13 | 12 | 07 | 06 | 03 | 02 |
| 55 | 54 | 51 | 50 | 45 | 44 | 41 | 40 | 15 | 14 | 11 | 10 | 05 | 04 | 01 | 00 |

ROTATED 90° — 804

| aa | a8 | a2 | a0 | 8a | 88 | 82 | 80 | 2a | 28 | 22 | 20 | 0a | 08 | 02 | 00 |
|---|---|---|---|---|---|---|---|---|---|---|---|---|---|---|---|
| ab | a9 | a3 | a1 | 8b | 89 | 83 | 81 | 2b | 29 | 23 | 21 | 0b | 09 | 03 | 01 |
| ae | ac | a6 | a4 | 8e | 8c | 86 | 84 | 2e | 2c | 26 | 24 | 0e | 0c | 06 | 04 |
| af | ad | a7 | a5 | 8f | 8d | 87 | 85 | 2f | 2d | 27 | 25 | 0f | 0d | 07 | 05 |
| ba | b8 | b2 | b0 | 9a | 98 | 92 | 90 | 3a | 38 | 32 | 30 | 1a | 18 | 12 | 10 |
| bb | b9 | b3 | b1 | 9b | 99 | 93 | 91 | 3b | 39 | 33 | 31 | 1b | 19 | 13 | 11 |
| be | bc | b6 | b4 | 9e | 9c | 96 | 94 | 3e | 3c | 36 | 34 | 1e | 1c | 16 | 14 |
| bf | bd | b7 | b5 | 9f | 9d | 97 | 95 | 3f | 3d | 37 | 35 | 1f | 1d | 17 | 15 |
| ea | e8 | e2 | e0 | ca | c8 | c2 | c0 | 6a | 68 | 62 | 60 | 4a | 48 | 42 | 40 |
| eb | e9 | e3 | e1 | cb | c9 | c3 | c1 | 6b | 69 | 63 | 61 | 4b | 49 | 43 | 41 |
| ee | ec | e6 | e4 | ce | cc | c6 | c4 | 6e | 6c | 66 | 64 | 4e | 4c | 46 | 44 |
| ef | ed | e7 | e5 | cf | cd | c7 | c5 | 6f | 6d | 67 | 65 | 4f | 4d | 47 | 45 |
| fa | f8 | f2 | f0 | da | d8 | d2 | d0 | 7a | 78 | 72 | 70 | 5a | 58 | 52 | 50 |
| fb | f9 | f3 | f1 | db | d9 | d3 | d1 | 7b | 79 | 73 | 71 | 5b | 59 | 53 | 51 |
| fe | fc | f6 | f4 | de | dc | d6 | d4 | 7e | 7c | 76 | 74 | 5e | 5c | 56 | 54 |
| ff | fd | f7 | f5 | df | dd | d7 | d5 | 7f | 7d | 77 | 75 | 5f | 5d | 57 | 55 |

ROTATED 270° — 808

| 55 | 57 | 5d | 5f | 75 | 77 | 7d | 7f | d5 | d7 | dd | df | f5 | f7 | fd | ff |
|---|---|---|---|---|---|---|---|---|---|---|---|---|---|---|---|
| 54 | 56 | 5c | 5e | 74 | 76 | 7c | 7e | d4 | d6 | dc | de | f4 | f6 | fc | fe |
| 51 | 53 | 59 | 5b | 71 | 73 | 79 | 7b | d1 | d3 | d9 | db | f1 | f3 | f9 | fb |
| 50 | 52 | 58 | 5a | 70 | 72 | 78 | 7a | d0 | d2 | d8 | da | f0 | f2 | f8 | fa |
| 45 | 47 | 4d | 4f | 65 | 67 | 6d | 6f | c5 | c7 | cd | cf | e5 | e7 | ed | ef |
| 44 | 46 | 4c | 4e | 64 | 66 | 6c | 6e | c4 | c6 | cc | ce | e4 | e6 | ec | ee |
| 41 | 43 | 49 | 4b | 61 | 63 | 69 | 6b | c1 | c3 | c9 | cb | e1 | e3 | e9 | eb |
| 40 | 42 | 48 | 4a | 60 | 62 | 68 | 6a | c0 | c2 | c8 | ca | e0 | e2 | e8 | ea |
| 15 | 17 | 1d | 1f | 35 | 37 | 3d | 3f | 95 | 97 | 9d | 9f | b5 | b7 | bd | bf |
| 14 | 16 | 1c | 1e | 34 | 36 | 3c | 3e | 94 | 96 | 9c | 9e | b4 | b6 | bc | be |
| 11 | 13 | 19 | 1b | 31 | 33 | 39 | 3b | 91 | 93 | 99 | 9b | b1 | b3 | b9 | bb |
| 10 | 12 | 18 | 1a | 30 | 32 | 38 | 3a | 90 | 92 | 98 | 9a | b0 | b2 | b8 | ba |
| 05 | 07 | 0d | 0f | 25 | 27 | 2d | 2f | 85 | 87 | 8d | 8f | a5 | a7 | ad | af |
| 04 | 06 | 0c | 0e | 24 | 26 | 2c | 2e | 84 | 86 | 8c | 8e | a4 | a6 | ac | ae |
| 01 | 03 | 09 | 0b | 21 | 23 | 29 | 2b | 81 | 83 | 89 | 8b | a1 | a3 | a9 | ab |
| 00 | 02 | 08 | 0a | 20 | 22 | 28 | 2a | 80 | 82 | 88 | 8a | a0 | a2 | a8 | aa |

FIG. 8

USE OF Z-ORDER DATA IN AN IMAGE SENSOR

CROSS-REFERENCE TO RELATED APPLICATION

This claims the benefit of G.B. Patent Application No. 0910387.0, filed Jun. 16, 2009, the entirety of which is hereby incorporated herein by reference.

FIELD OF THE INVENTION

The present invention is directed to systems and methods for detecting objects in an object class using image data presented in Z order.

BACKGROUND OF THE DISCLOSURE

Modern cameras and other image capturing devices offer a wide variety of capabilities, such as automatic exposure, color balancing, and open eye detection. These capabilities depend on the camera's ability to determine where the regions of interest are in the scene, such as the location and size of the faces.

To determine the location and size of these objects, cameras typically include a dedicated memory that is large enough to store an entire frame of the scene. This dedicated memory is often referred to as a "framestore" and can be undesirably large and area-consuming. Once an entire frame is stored in the framestore, a high-power processor repeatedly fetches and analyzes data from the framestore to identify the faces (or other objects) of interest. This process of identifying objects may take up a large proportion of the processing time and power in a camera.

BRIEF DESCRIPTION OF THE DRAWINGS

FIG. 8 is a graphical representation of a 16×16 block of image data in four orientations.

DETAILED DESCRIPTION OF THE DISCLOSURE

Figure 1:
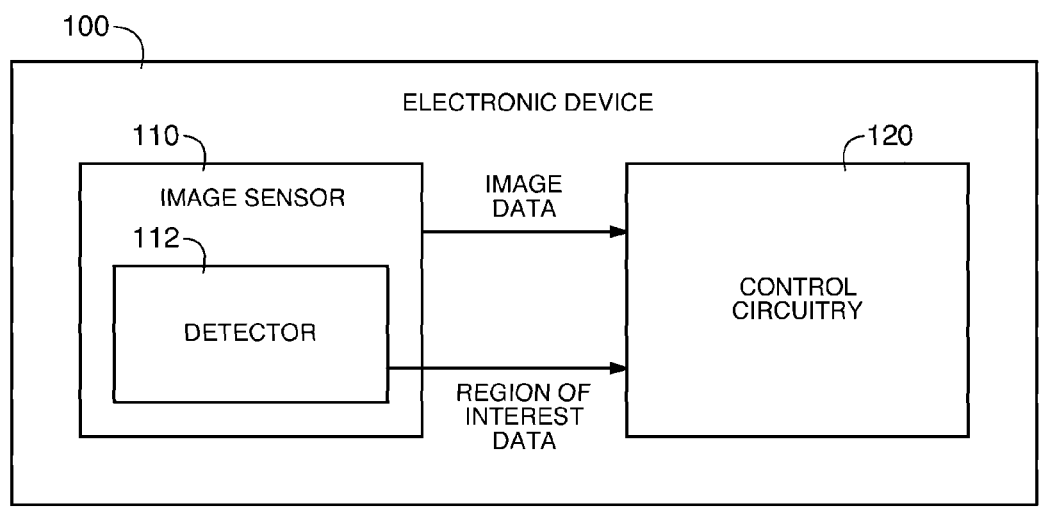
FIG. 1 is a schematic view of an illustrative electronic device configured in accordance with embodiments of the invention.

FIG. 1 is a schematic view of an illustrative electronic device configured in accordance with embodiments of the invention. Electronic device 100 can be any type of user device that utilizes an image sensor (embodied here as image sensor 110) and is controlled generally by control circuitry 120. For example, electronic device 100 can include a camera, such as a computer camera, still camera, or portable video camera. Electronic device 100 can also include any other components in a typical camera (or otherwise), which are not depicted in FIG. 1 to avoid any distractions from embodiments of the invention.

Image sensor 110 can capture image data corresponding to a streaming image. For example, image sensor 110 can include any combination of lenses and arrays of cells (e.g., charge-coupled devices (CCDs) or CMOS sensor cells) for capturing pixels. Image sensor 110 can further include detector 112. Detector 112 may be configured to identify relevant information about the streaming image. For example, detector 112 may analyze the image data for the presence of particular objects. These objects may belong to a particular object class, such as faces.

As used herein, an "object class" may refer to a collection of objects sharing common attributes, but where individual objects in the collection may appear differently. For example, faces may be an object class, because although each individual face is distinguishable from other faces, faces have a number of characteristic features such as two eyes, a nose, a mouth, and a chin. Another example of an object class is a bird object class (e.g., with characteristic features of a beak and two wings). For simplicity, the various embodiments disclosed herein will be described in terms of detecting faces. However, it should be understood that this is merely illustrative, and that objects of any other object class may be detected instead (e.g., birds or other animals).

Detector 112 may detect for the presence of faces. In some embodiments, detector 112 can perform face detection using luminance information from a luminance channel (e.g., Y channel or G channel of RGB), and may not need color information. Detector 112 can provide relevant information about any of the detected faces to control circuitry 120. The relevant information is identified in FIG. 1 as "region-of-interest data," and can include positional information about the detected faces, such as the general location of the faces (e.g., x-y coordinates), the size of the faces, and how certain image sensor 110 is of the presence of the faces at each location.

Control circuitry 120 may process the image data and region-of-interest data generated by sensor 110, and may perform any suitable operations based on this data. For example, because users of electronic device 100 may want faces to remain clear and bright, control circuitry 120 can perform automatic exposure, color balancing, or focus control (or any combination thereof) based on the provided positional information of the detected faces. In some embodiments, control circuitry 120 can identify further contextual information about the detected faces, such as information on whether the faces include open eyes and/or a smile. In these or other embodiments, control circuitry 120 can provide or update system functions based on the detected faces. For example, if electronic device 100 includes a computer and a computer camera (e.g., webcam), control circuitry 120 may be configured to wake up a "hibernating" computer in response to detecting the presence of a face in front of the computer camera. This way, the user does not need to perform any express actions to activate the computer.

Because control circuitry 120 is provided with positional information about the faces in a scene, control circuitry 120 may not need to perform any face detection functions itself. Thus, in some embodiments, substantial processing time and power may be saved, since control circuitry 120 may immediately (if desired) begin performing the above-described capabilities, such as automatic exposure, color balancing, and focus control.

Detector 112 (or image sensor 110 in general) and control circuitry 120 may be implemented using any suitable combination of hardware and software. In some embodiments, detector 112 can be implemented substantially all in hardware. For example, image sensor 110 may be implemented as a system-on-a-chip (SoC). This way, detector 112 can have a small design that minimizes the area of image sensor 110, and detector 112 may have circuit components designed to maximize the speed of operation. Control circuitry 120 may include, for example, one or more processors, microprocessors, ASICS, FPGAs, or any suitable combination of hardware and software.

Figure 2:
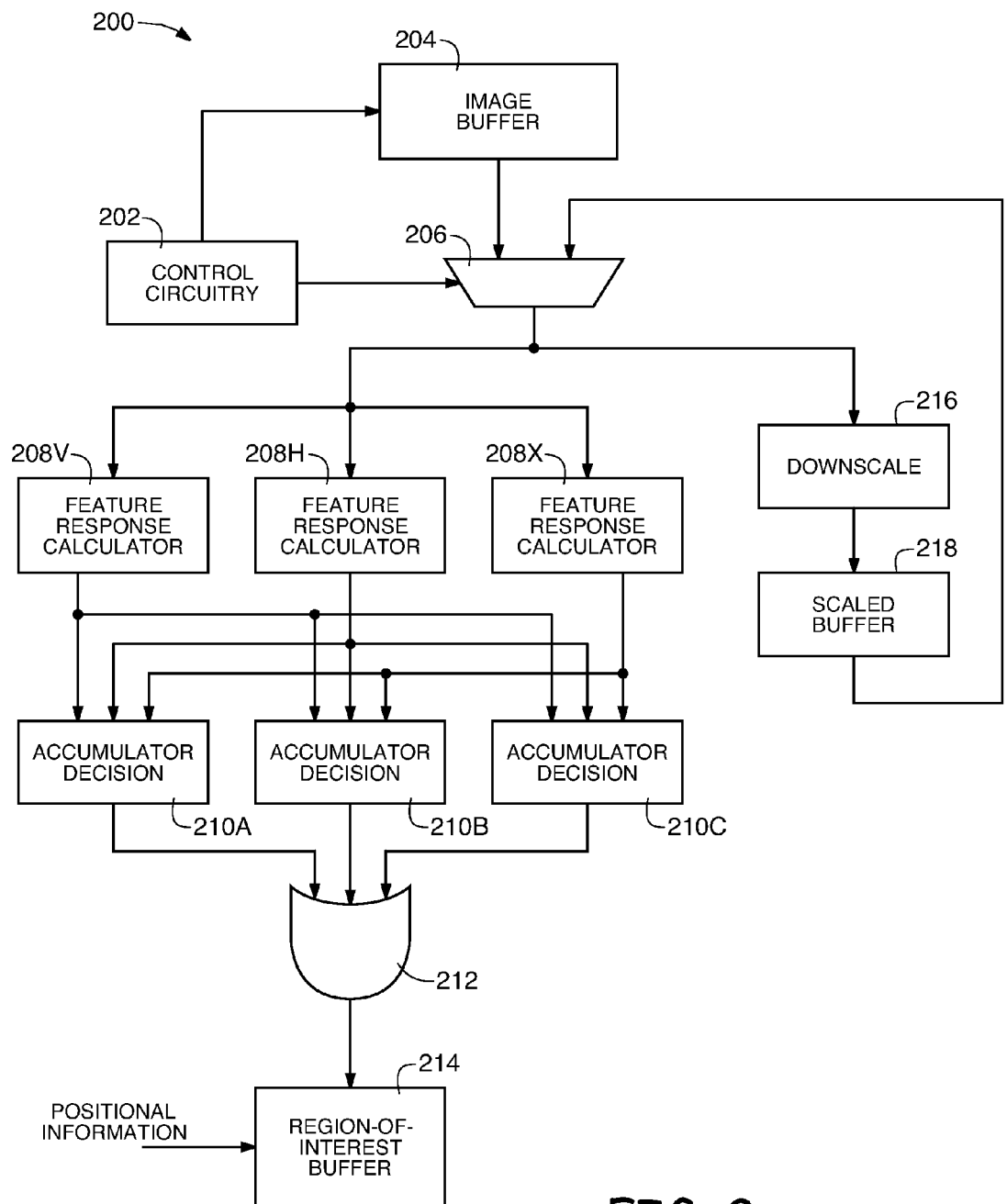
FIG. 2 is a schematic view of an illustrative detector configured in accordance with embodiments of the invention.

FIG. 2 is a schematic view of detector 200, which may be configured in accordance with an embodiment of the invention. In some embodiments, detector 200 may have any of the features and functionalities of detector 112 of FIG. 1 (and vice versa). Detector 200 can include control circuitry 202, image buffer 204, multiplexer 206, feature response calculators 208V, 208H, and 208X, accumulator/decision modules 210A-210C, OR gate 212, region-of-interest buffer 214, downscale module 216, and scaled buffer 218. In some embodiments, the overall data flow and storage addressing techniques described below may be completely or partially controlled by control circuitry 202, which can be implemented using any combination of hardware (e.g., logic gates) and software.

Image buffer 204 may be used to store image data captured by sensor 200 (e.g., from the CCD or CMOS cells). Image buffer 204 can include any suitable form of volatile memory, such as SDRAM or RAM, any suitable non-volatile memory, or a combination thereof. Image buffer 204 may be sized to store less than an entire frame of the streaming image. In some embodiments, image buffer 204 may be sized similarly to, or can have any other features and functionalities of, the image buffers described in co-pending, commonly-assigned G.B. Patent Application No. 0910386.2, filed Jun. 16, 2009, entitled "OBJECT DETECTION USING AN IN-SENSOR DETECTOR." This way, detector 200 may not need a framestore, which can allow detector 200 to be implemented within a sensor chip (e.g., image sensor 110)

Figure 3:
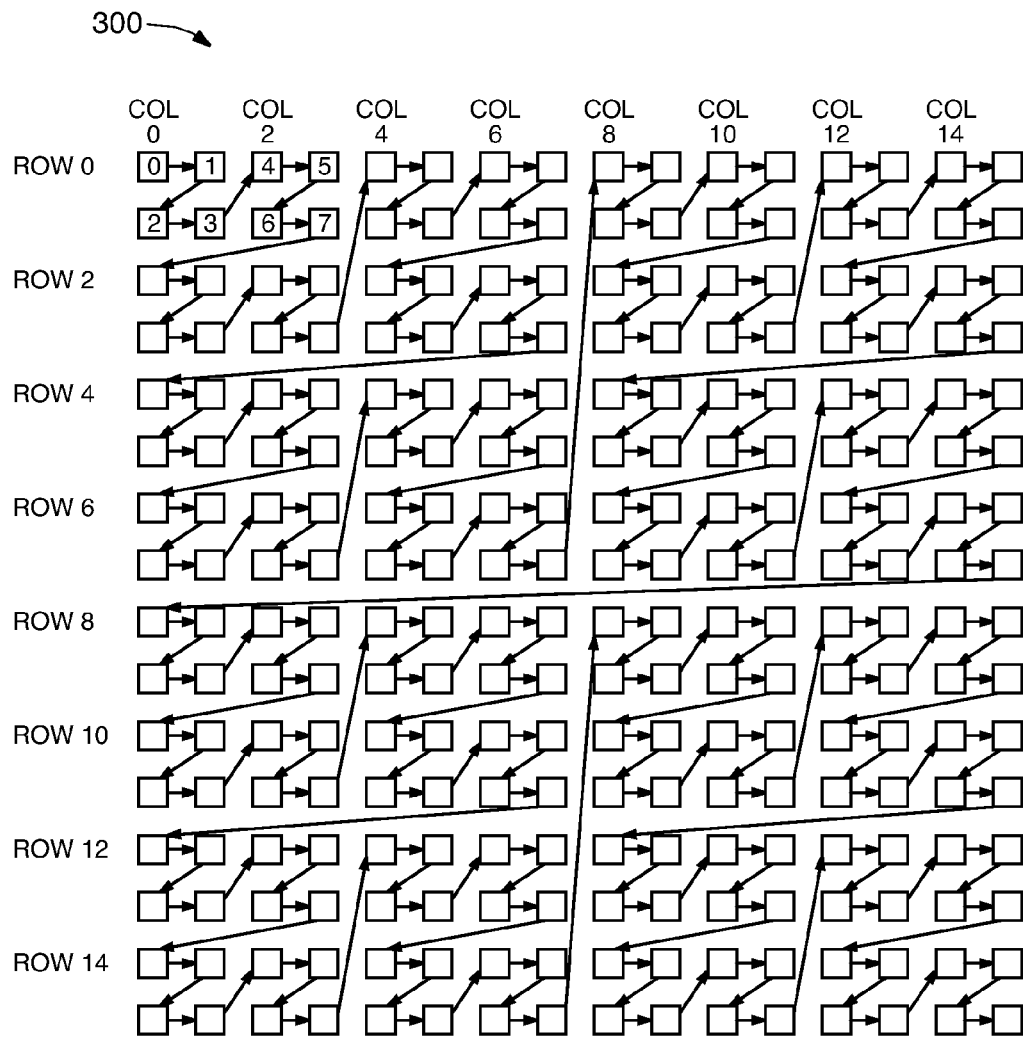
FIG. 3 is a graphical representation of a 16×16 block of image data presented in Z-order.

Referring briefly to FIG. 3 (and with continued reference to FIG. 2), a graphical representation of a 16×16 block of pixels is shown, which may be used to demonstrate how image data can be stored and read out from image buffer 204. Block 300 may be stored in raster order—that is, the image data may be stored in a sequence that proceeds from left to right (e.g., from col. 0 to col. 15) across the first line (e.g., row 0), then from left to right across the second line (e.g., row 1), etc. While image buffer 204 may store the pixels in raster order, the pixels may be read out of image buffer 204 in Z-order (also known as Morton order). The Z-ordered sequence is illustrated in FIG. 3 by arrows linking one pixel to another. The Z order allows groups of four neighboring pixels to be read out one after another (e.g., in a Z-shaped sequence, such as pixels 0, 1, 2, and 3 in the top left corner). Each group of four-pixels may be referred to sometimes as a "Z-quad."

With continued reference to FIGS. 2 and 3, control circuitry 202 may use any suitable technique to read out data from image buffer 204 in Z order. In some embodiments, image buffer 204 may include a random access memory (RAM), and control circuitry 202 can address image buffer 204 such that the image data is read out in Z order. For example, to read the fifth pixel from image buffer 204, which corresponds to pixel 4 (binary address: 000000000100), control circuitry 202 can convert the binary address into a "row address" and "column address" suitable for addressing image buffer 204. The position of any pixel (here, pixel 4) in Z order is related to the row and column address according to:

Position=$\{r_5, c_5, r_4, c_4, r_3, c_3, r_2, c_2, r_1, c_1, r_0, c_0\}$=000000000100, and thus, Row=$\{r_5, r_4, r_3, r_2, r_1, r_0\}$=000000 (e.g., row 0); and Column=$\{c_5, c_4, c_3, c_2, c_1, c_0\}$=000010 (e.g., col. 2).

Continuing with the sequence, the sixth pixel—e.g., pixel 5 with:

Position=$\{r_5, c_5, r_4, c_4, r_3, c_3, r_2, c_2, r_1, c_1, r_0, c_0\}$=000000000101, can be converted to Row=$\{r_5, r_4, r_3, r_2, r_1, r_0\}$=000000 (e.g., row 0); and Column=$\{c_s, c_4, c_3, c_2, c_1, c_0\}$=000011 (e.g., col. 3), and the seventh pixel—e.g., pixel 6 with:

Position=$\{r_5, c_5, r_4, c_4, r_3, c_3, r_2, c_2, r_1, c_1, r_0, c_0\}$=000000000110, can be converted to Row=$\{r_5, r_4, r_3, r_2, r_1, r_0\}$=000001 (e.g., row 1); and Column=$\{c_5, c_4, c_3, c_2, c_1, c_0\}$=000010 (e.g., col. 2).

Accordingly, to read out the image data is Z order, control circuitry 202 can increment an address counter starting from h'00 (zero in hexadecimal). Control circuitry 202 can convert each value into a row address and column address usable to address the raster-scan-stored image data.

Figure 5:
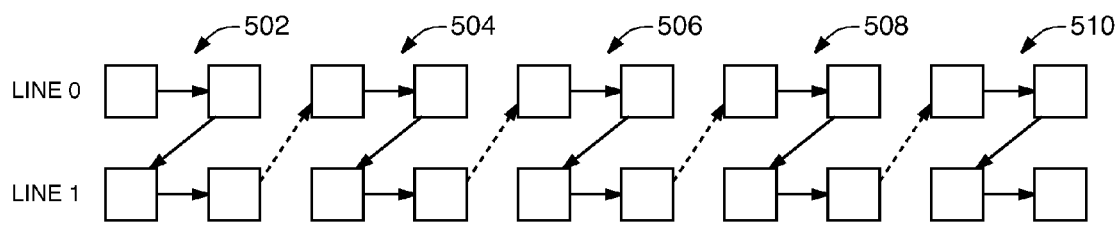
FIGS. 5 and 6 illustrate the process of converting image data stored in raster order to Z order in accordance with embodiments of the invention.
Figure 6:
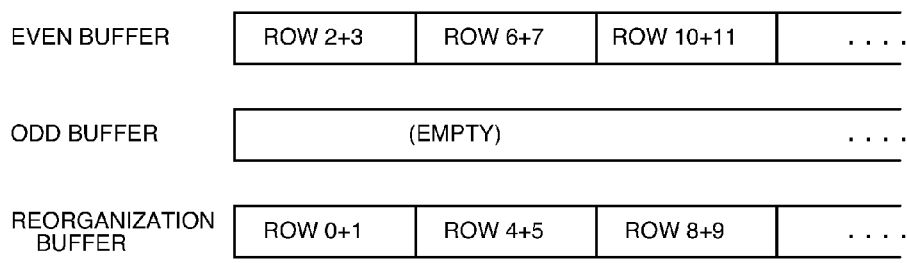

In other embodiments, image buffer 204 may include one or more sequentially-accessed memories (SAMs) instead of random access memory. The SAMs may not be randomly accessed in the manner described above. In these embodiments, control circuitry 202 may instead read out data from image buffer 204 and re-write the data back into image buffer 204 in a manner which changes the order of the data. This technique is illustrated in FIGS. 4-6.

Figure 4:
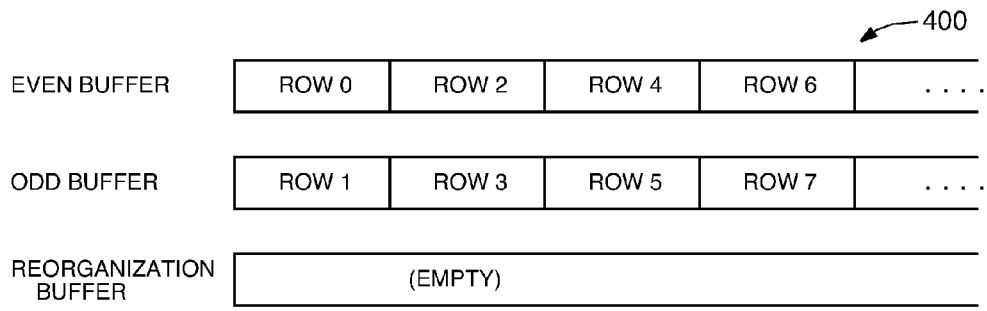
FIG. 4 is a schematic view of an image buffer having rows of image data stored in raster order.

Referring first to FIG. 4, a schematic view of image buffer 400 is shown, which may correspond to a more detailed view of image buffer 204 (FIG. 2). As such, image buffer 400 will be described as if it is implemented as part of image buffer 204, and FIG. 4 (as well as FIGS. 5 and 6) will be discussed with continued reference to FIG. 2.

Image buffer 400 can include three sequentially accessed memories: an even buffer, an odd buffer, and a reorganization buffer. Initially, the even buffer may store the pixels for even lines of an image in raster order (starting with row 0). The odd buffer may store the pixels for odd lines of an image in raster order (starting with row 1). The reorganization buffer may initially be empty.

To start the conversion from raster order to Z order, control circuitry 202 can combine and reorder pairs of rows to create Z-quads. In particular, control circuitry 202 can combine row 0 (from the even buffer) with row 1 (from the odd buffer), row 2 with row 3, row 4 with row 5, and so on. FIG. 5 illustrates the process that control circuitry 202 may use to combine rows 0 and 1, which may also be used to combine other pairs of rows.

First, control circuitry 202 can read out two pixels from the even buffer and two pixels from the odd buffer. These four pixels may form the first Z-quad 502, which can be stored in the reorganization buffer. Control circuitry 202 may then continue reading out pairs of pixels from both the even and odd buffers to form Z-quads 504, 506, 508, 510, and so on, all of which may be stored in the reorganization buffer.

Control circuitry 202 may combine and re-order rows 2 and 3, 4 and 5, 6 and 7, etc. using a similar technique. Control circuitry 202 can alternate between writing the combined rows into the reorganization buffer and the even buffer. For example, FIG. 6 illustrates the contents of the even, odd, and reorganization buffers after all of the rows have been paired and combined.

At this point, control circuitry 202 can start a second iteration of combining and reordering the contents of image buffer 400. In particular, control circuitry 202 can combine and reorder the contents of the even buffer and reorganization buffer using a similar technique as discussed above. However, instead of combining four pixels into Z-quads, control circuitry 202 can combine four Z-quads into larger 8×8 Z-shaped constructs. Control circuitry 202 can read out pairs of Z-quads (instead of pairs of pixels) from the even buffer and pairs of Z-quads from the organization buffer, and can reorder and rewrite them into the empty odd buffer. At the completion of the second iteration, all of the pixels may be stored as 8×8 Z-ordered blocks in the odd buffer and the reorganization buffer (for example).

Control circuitry 202 can continue iterating through the blocks in this fashion until a full Z-ordered sequence is obtained. At this point, image data can be read out of the sequentially-accessed image buffer in Z order without having to manipulate addresses for random accessing.

Returning to FIG. 2, detector 200 can use the Z-ordered data to perform face detection on the image. In particular, control circuitry 202 may be configured to initiate face detection on a block of the image. In some embodiments, detector 200 may decompose the image into multiple, overlapping blocks and determine whether a face is present in each of the blocks. The block can have any suitable predetermined size (e.g., 16 pixels×16×pixels, 32×32, or 64×64). For purposes of clarity, and not of limitation, various embodiments of the invention will be described for processing 32×32 blocks. A 32×32 block includes 16×16=256 Z-quads, and therefore 256 Z-quads may be sequentially read out of image buffer 204 to process each block. In some embodiments, image buffer 204 may be configured to provide the four pixels of Z-quad concurrently each time image buffer 204 is addressed.

It should be understood that, while various embodiments of the invention will be described in terms of reading out one Z-quad at a time, this is merely illustrative and pixel groups of any other size may be used instead (e.g., 1 pixel, 16 pixels, etc.).

Image buffer 204 can provide each Z-quad of the 32×32 block to multiplexer 206. When control circuitry 202 selects the output of buffer 204, the Z-quad may be provided through two paths. The first path can include feature response calculators 208V, 208H, and 208X through region-of-interest buffer 214, and the second path can include downscale module 216 and scaled buffer. The first path may be used to determine whether the pixel values of each Z-quad make it more or less likely that a face is present in image, and therefore the component in the first path may collectively be referred to as an "object detection module." For example, the characteristics of the four pixels may be ones that are commonly found in faces (thereby increasing the likelihood that the block includes a face), or the four pixels may have characteristics that are not typically found in faces. The second path, which is described in greater detail below, can be used to reduce the resolution of the image for further processing. Accordingly, the components in the second path may sometimes be referred to collectively as a "downscale module."

Looking first to the object detection module, feature response calculators 208V, 208H, and 208X can determine the characteristics of a Z-quad, such as whether the Z-quad includes a high or low light contrast. Each of feature response calculators 208V, 208H, and 208X can compute a different characteristic.

For example, in some embodiments, calculator 208V can detect lighting contrasts in the vertical direction (e.g., dark-to-light from top to bottom or vice versa), calculator 208H to detect lighting contrasts in the horizontal direction (e.g., dark-to-light from left to right or vice versa), and calculator 208X to detect diagonal lighting contrasts (e.g., dark-to-light from top-left to bottom-right or vice versa). These three characteristics may be referred to as "features" and may be represented by the following Z-ordered kernels:

V=[1, 1, −1, −1];
H=[−1, 1, −1, 1]; and
X=[1, −1, −1, 1].

To compute a "feature response," feature response calculators 208V, 208H, and 208X can convolve a Z-quad with the V, H, and X kernels, respectively. A "feature response" can indicate how similar or compatible the Z-quad is to the feature. For example, a greater feature response can indicate that the Z-quad has a greater lighting contrast in the corresponding direction.

In other embodiments, detector 200 can include a different number of feature response calculators so that a different number of feature responses can be computed. For example, detector 200 can include additional feature response calculators for lighting contrasts at additional angles.

Accumulator/decision modules 210A-210C may use the three feature responses for each Z-quad to determine whether a face is present in a 32×32 block. Depending on the location of a Z-quad in the 32×32 block, a high contrast in a given direction may or may not increase the likelihood that a face is present within the 32×32 block. For example, high contrast in the middle of the 32×32 block may indicate the presence of a nose, while high contrast above that point (where a low-contrast forehead would be) may indicate that a face is likely not present in the 32×32 block. Thus, accumulator/decision modules 210A-210M can determine, based on each Z-quad's feature responses and its corresponding location in the 32×32 block, whether a face is likely present in the 32×32 block. This can involve determining whether each feature response makes it more or less likely that a face is present, accumulating the results for each Z-quad in the 32×32 block, and making a decision based on the accumulated results. One way in which accumulator/decision modules 210A-210M can be implemented will be described in greater detail below in FIG. 7 of this disclosure.

Detector 200 can include any suitable number of accumulator/decision modules 210A-210C (and not just three), each of which may process the feature responses using a different set of criteria to determine whether a face is present. Using OR gate 212, if any one of accumulator/decision modules 210A-210C determines that a face is present within the 32×32 block, information about that block may be saved in region-of-interest buffer 214. Region-of-interest buffer 214 can save positional information about the 32×32 block, such as the location of the block (e.g., x-y coordinates of a corner of the block), the downsampling rate use to obtain the block, and the strength of the decision by accumulator/decision modules 210A-210C. This way, detector 200 may be able to provide information about each 32×32 block that likely includes a face to, for example, a camera's control circuitry (e.g., control circuitry 120 of FIG. 1).

As discussed above, the Z-quads from image buffer 204 may be provided to downscale module 216 (and not just to feature response calculators 208V, 208H, and 208X). This may allow downscale module 216 to operate at least substantially concurrently with the feature response calculators and accumulator/decision modules of detector 200. Downscale module 216 can scale down the Z-quad by, for example, averaging the four pixels of the Z-quad together to produce a new pixel at a lower resolution. This new pixel can be saved in scaled buffer 218, and can form one quarter of a new Z-quad. At a suitable time (e.g., after a 32×32 block from image buffer 204 has been processed or after scaled buffer 218 is filled to a predetermined amount), control circuitry 202 can control multiplexer 206 to pass information from scaled buffer 218 instead of image buffer 204. This way, face detection can begin on the scaled-down image data.

Control circuitry 202 can operate using scaled buffer 218 in the same or a similar manner as using image buffer 204. For example, control circuitry 202 can sequentially read Z-quads from scaled buffer 218 and provide the Z-quads to feature response calculators 208V, 208H, and 208X. Since the Z-quads from scaled buffer 218 are scaled down (and therefore correspond to 4×4 pixel groups instead of 2×2 pixel groups, for example), this allows feature response calculators 208V, 208H, and 208X to process larger pixel groups (and not just Z-quads) using the same components as the 2×2 pixel groups. This way, the size of detector 200 can remain suitably small to be implemented in an image sensor integrated circuit.

Downscale module 216 may downscale an image any suitable number of times. More particularly, while downscaled image data is being passed out of multiplexer 206, downscale module 216 can average the downscaled image data to produce even lower-resolution data. Downscaled buffer 218 may therefore be used to store increasing scaled down image data for face detection analysis. As such, for each 32×32 block, accumulator/decision modules 210A-210C may accumulate results corresponding to feature responses at various different resolutions.

Figure 7:
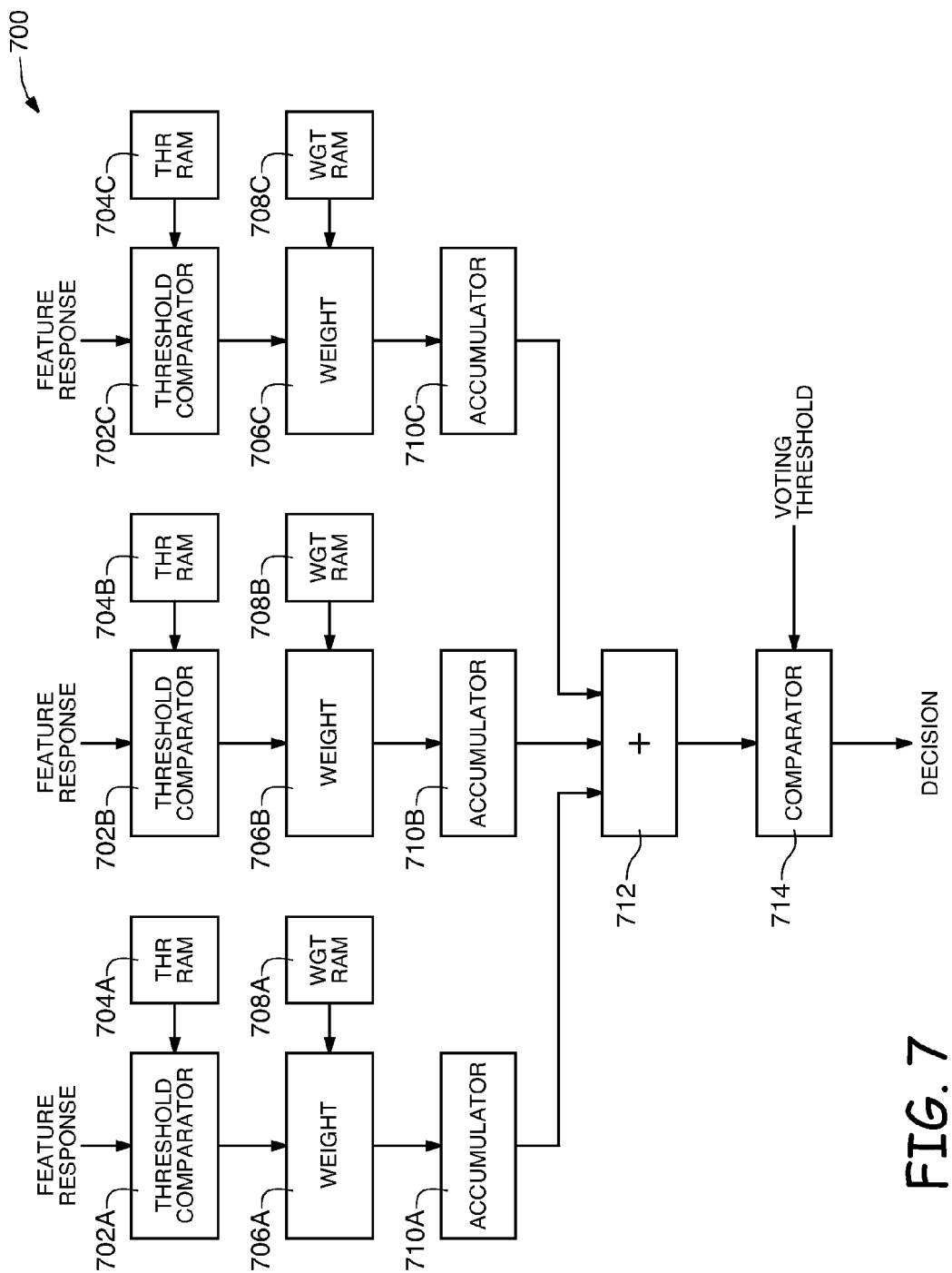
FIG. 7 is a schematic view of a accumulator/decision module configured in accordance with embodiments of the invention.

Referring now to FIG. 7, a schematic view of accumulator/decision module 700 is shown, which can be configured in accordance with an embodiment of the invention. In some embodiments, accumulator/decision module 700 may have any of the features and functionalities of any of accumulator/decision modules 210A-210C of FIG. 2 (and vice versa). Accumulator/decision module 700 can include threshold comparators 702A-702C, threshold RAMs 704A-704C, weighting modules 706A-706C, weight RAMs 708A-708C, accumulators 710A-710C, adder 712, and comparator 714.

As illustrated, accumulator/decision module 700 can be configured to receive three feature responses. In some embodiments, the three feature responses may correspond to the responses of a Z-quad to the V, H, and X kernels discussed above in connection with FIG. 2. In other embodiments, accumulator/decision module 700 may include additional or fewer components to handle a different number of feature responses.

For simplicity, because accumulator/decision module 700 can include multiple instances of the same or similar components (e.g., threshold comparators 702A-702C, etc.), only one of each will be described, but it should be understood that the description can apply to any of the other instances.

Threshold comparator 702A may receive one of the feature responses (e.g., based on the V, H, or X kernel), and can compare that feature response to a pair of thresholds. The thresholds may be provided by threshold RAM 704A, discussed below. If the feature response falls between the provided thresholds, this may be an indicator that a face is more (or less) likely to be present in the 32×32 block. In some embodiments, threshold comparator 702 may produce a positive value output if the feature response increases the likelihood that a face is present, and may produce a negative value output otherwise.

Threshold RAM 704A may be implemented using any suitable type of permanent (e.g., ROM) or semi-permanent storage, and not just as a RAM. As discussed above, threshold RAM 704A may be used to store pairs of thresholds (e.g., for the initial resolution and any scaled-down resolutions). To provide pairs of thresholds to threshold comparator 702A, threshold comparator 702A may be addressed based on the location of the Z-quad within a 32×32 block. In some embodiments, threshold RAM 704 may be sequentially addressed (e.g., from position h'00 through h'FF) as each of the 16×16 Z-quad feature responses are processed. For example, if threshold comparator 702A is operating on the Nth Z-quad in the 32×32 in Z order, threshold RAM 704a may be addressed to provide the Nth pair of thresholds to threshold comparator 702A.

Because different features at different locations may be stronger indicators than others as to whether a face is present, weighting module 706 may scale the value provided by threshold comparator 702A based on the strength of the indicator. In particular, weighting module 706A may multiply the value by a weight provided by weight RAM 708A. Thus, weighting module 706A may provide a weighted value which has a magnitude corresponding to the strength of the indicator and a sign corresponding to whether the feature indicates that a face is or is not present. As with threshold RAM 704A, weight RAM 708A may include any suitable type of permanent (e.g., ROM) or semi-permanent storage, and may be addressed based on the location of the Z-quad within a 32×32 block. In some embodiments, weight RAM 708A may be sequentially addressed (e.g., from position h'00 through h'FF) as each of the 16×16 Z-quad feature responses are processed.

Accumulator 710A may accumulate all of the weighted values from weighting module 706A that correspond to the 32×32 block. In particular, a 32×32 block can include 16×16 Z-quads, so accumulator 710a may collect the weighted values for feature responses corresponding to all of the 16×16 Z-quads. Accumulator 210A may also collect the weighted values for feature responses corresponding to lower-resolution Z-quads of the same 32×32 block. Once the 32×32 block is analyzed, adder 712 can combine the outputs of accumulators 710A-710C. Then, comparator 712 can compare the result with a voting threshold. If the result is greater than the voting threshold, comparator 712 may output a decision that a face is present in the 32×32 block. As discussed above in connection with OR gate 212 of FIG. 2, this decision can be used with decisions from other accumulator/decision modules to make a final decision as to whether a face is present within the 32×32 block.

As discussed above, each feature response may be processed based on at least three values: two thresholds (from a threshold RAM) and one weight (from a weight RAM). For simplicity, any of these values may be referred to herein as a "coefficient" and their respective memories may be referred to herein as "coefficient memories."

In some embodiments of the invention, the detectors (e.g., detector 200 of FIG. 2) may be configurable to detect faces in image data even if the image data is rotated. Such rotations may occur, for example, when a user turns the camera to change the orientation of the image from portrait to landscape, or vice versa. Thus, image data may commonly be stored in image buffer 204 (FIG. 2), for example, with a 90° (clockwise), 180°, or 270° rotation.

FIG. 8 shows an illustrative 16×16 block of image data (which can represent blocks of pixels, Z-quads, or other pixel groups) in four orientations. In particular, block 802 may be a 16×16 block of image data, where each pixel is labeled according to its position in Z-order. Blocks 804, 806, 808 illustrate the effect of rotating block 802 by 90°, 180°, and 270°, respectively. As can be seen from comparing these blocks, rotations can have at least two effects on image data that is read out of, for example, image buffer 204 (FIG. 2). First, the four pixels in each Z-quad may be provided in a different order. For example, if block 802 represents a 16×16 block of unrotated pixels, rotating pixels {0, 1, 2, 3} by 90° can produce the pixels in an ordering of {2, 0, 3, 1} (shown in the upper right corner of block 804). Second, the Z-quads themselves may be read out in a different order. For example, if each element in block 802 instead represents a Z-quad, the 16×16 Z-quads may be ordered according to {00, 01, . . . , FE, FF} in hexadecimal when there is no rotation, but may be ordered according to {AA, A8, . . . , 57, 55} in hexadecimal when the image is rotated 90° (as shown in block 804).

Referring again to FIG. 2, detector 200 may be configured to handle the effects of storing images that are rotated. In particular, because the four pixels of a Z-quad may be provided in a different order, feature response calculators 208V, 208H, and 208X can modify the kernels to counteract the rotation. For example, for 90° rotations (e.g., block 804 of FIG. 8), feature response calculators 208V, 208H, and 208X can use the following modified kernels H', V', and X' instead of the above-described zero-rotation V, H, and X kernels, respectively:

H'=−V=[−1, −1, 1, 1];
V'=H=[1, 1, −1, −1]; and
X'=−X=[−1, 1, 1, −1].

Thus, calculator 208V (which is associated with the V kernel) can produce a feature response for the H feature by using a negated V kernel, and calculator 208H (which is associated with the H kernel) can produce a feature response for the V feature.

Similarly, for 180° rotations, feature response calculators 208V, 208H, and 208X can use the following modified kernels V', H', and X' instead of the zero-rotation V, H, and X kernels, respectively:

V'=−V=[−1, −1, 1, 1];
H'=−H=[1, −1, 1, −1]; and
X'=X=[1, −1, −1, 1].

Finally, for 270° rotations: feature response calculators 208V, 208H, and 208X can use the following modified kernels H', V', and X' instead of the zero-rotation V, H, and X kernels, respectively:

H'=V=[1, 1, −1, −1]; and
V'=−H=[1, −1, 1, −1];
X'=−X=[−1, 1, 1, −1].

In some embodiments, control circuitry 202 can provide a flag to feature response calculators 208V, 208H, and 208X indicating which orientation to use for face detection. Using this flag, feature response calculators 208V, 208H, and 208X can selectively negate its associated kernel to obtain any of the above modified kernels. The flag may be selected using any suitable technique. For example, control circuitry 202 may iterate through all four orientations using the flag so that faces in all orientations can be detected.

As discussed above, when the image data stored in image buffer 204 is rotated, the Z-quads may be read out in a different order than when there is no rotation. Therefore, the feature responses received by accumulator/decision modules 210A-210C may also be in this different order. In some embodiments, accumulator/decision modules 210A-210C may adapt to this difference by reading out thresholds and weights in that different order. This way, the thresholds and weights can still be matched up to the corresponding feature responses—the results would just be accumulated in a different order.

In particular, referring again to FIG. 7, when there is no rotation, coefficients can be read out of threshold RAMs 704A-704C and weight RAMs 708A-708C in sequential order (e.g., "00000000", . . . , "11111111"). Thus, the coefficient memories may be addressed by eight address bits, as follows:

address_0°={$a_7, a_6, a_5, a_4, a_3, a_2, a_1, a_0$} (where $a_7$ is the MSB), where the eight address bits are updated to achieve the sequential ordering. When there is a 90°, 180°, or 270° rotation, the address bits can be rearranged according to:

address_90°={$\sim a_6, a_7, \sim a_4, a_5, \sim a_2, a_3, \sim a_0, a_1$};
address_180°={$\sim a_7, \sim a_6, \sim a_5, \sim a_4, \sim a_3, \sim a_2, \sim a_1, \sim a_0$}; and
address_270°={$\sim a_6, a_7, \sim a_4, a_5, \sim a_2, a_3, \sim a_0, a_1$} to obtain the modified sequence for each rotation. This way, the threshold and weight RAMs of FIG. 7 can be addressed by converting the "00000000", . . . , "11111111" (or 00, 01, 02 . . . , FE, FF in hexadecimal) sequence when there is no rotation to a:

AA, A8, AB, . . . , 57, 55 sequence for 90° rotations;
FF, FE, FD, . . . , 01, 00 sequence for 180° rotations; and
55, 57, 54, . . . , A8, AA sequence for 270° rotations.

This corresponds to the order of Z-quads shown in blocks 804, 806, and 808 of FIG. 8, respectively. Thus, since the coefficients can be matched to the appropriate feature responses, decision/accumulator 700 may be as effective at detecting faces in a rotated orientation as a non-rotated orientation.

As with feature response calculators 208V, 208H, and 208X (FIG. 2), control circuitry 202 (FIG. 2) may provide a flag to decision/accumulator 700 indicating a particular rotation. Using the flag, decision/accumulator 700 can determine which sequence to use for reading out coefficients from the coefficient memories (e.g., threshold RAMs 704A-704C and weight RAMs 706A-706C).

In other embodiments, rather than reading out the coefficients in a different order, the image data from image buffer 204 may be read out in the different order. This way, the sequence of feature responses received by accumulator/decision modules 210A-210C may be unchanged with respect to the un-rotated sequence, and therefore the order of coefficients read out of the corresponding coefficient memories can remain unchanged.

In some embodiments of the invention, detector 200 may be configured to concurrently detect faces in multiple rotations, such as any combination of 0°, 90°, 180°, and 270°. This may allow detector 200 to perform face detection without first determining which orientation the image data is in, or to save processing time by not having to iterate through the four orientations.

As discussed above, the sequence of feature responses provided to accumulator/decision modules 210A-210C may depend on the orientation of the image data. For example, the first feature response in the sequence may correspond to position 00, AA, FF, or 55 depending on the orientation. Thus, to process a particular feature response for all four orientations (for example), four sets of coefficients for the four different positions may be needed. In some embodiments, the coefficient memories (e.g., threshold RAMs 704A-704C and weight RAMs 708A-708C) can provide the four sets of coefficients during the same read operation. This can be accomplished by providing four separate storage units in each coefficient memory. Since the four positions for each feature response are in a different quadrant of the 32×32 block, each of the four storage units can store the coefficients for one of the quadrants.

Figure 9:
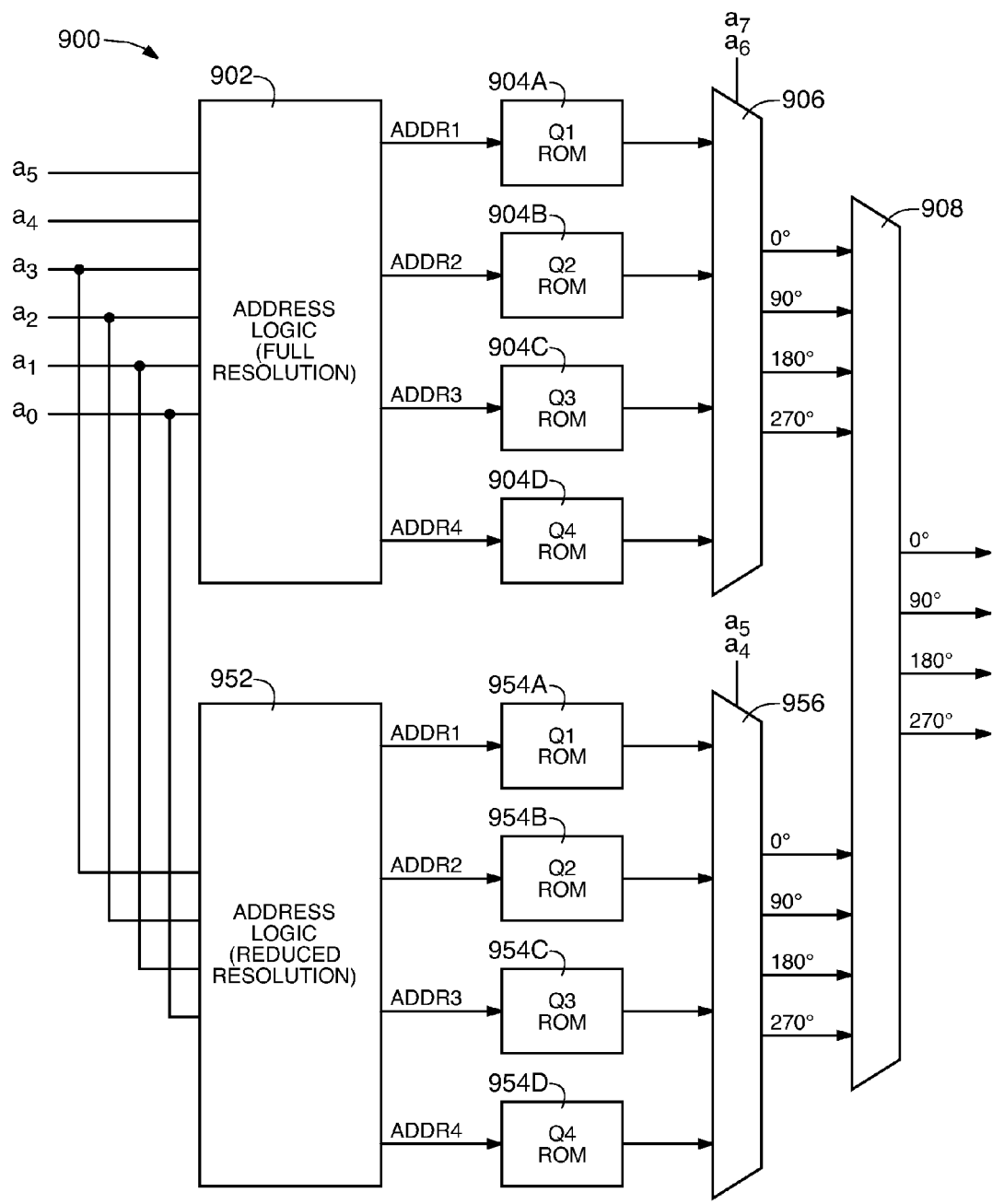
FIG. 9 is a schematic view of coefficient memory configured in accordance with embodiments of the invention.

FIG. 9 is a schematic diagram of a coefficient memory 900 configured to provide four coefficients in this manner. Coefficient memory 900 may have any of the features and functionalities of threshold RAMs 704A-704C and weight RAMs 708A-708C in FIG. 7 (and vice versa), or any other coefficient memory. For simplicity, coefficient memory 900 will be described as if it is implemented as part of detector 200 of FIG. 2, and FIG. 9 will be discussed with continued reference to FIG. 2. Coefficient memory 900 can include address logic 902 and 904, read only memories (ROMs) 904A-904D and 954A-954D, and selection logic (embodied as multiplexers 906 and 956 and multiplexer 908).

In FIG. 9, ROMs 904A-904D can store the coefficients (e.g., weights or thresholds) for the first, second, third, and fourth quadrants of the 32×32 block, respectively. In particular, ROM 904A may store the coefficients corresponding to Z-quad positions h'00 through h'3F in Z-order, ROM 904B may store the coefficients corresponding to positions h'40 through h'7F, ROM 904C may store the coefficients corresponding to positions h'80 through h'BF, and ROM 904D may store the coefficients corresponding to positions h'C0 through h'FF. The coefficients may correspond to those used when the feature responses are full resolution—that is, when processing is performed on image data from image buffer 204 (FIG. 2) rather than from scaled buffer 218.

Address logic 902 may receive at least some of the address bits (e.g., the lowest six of eight address bits) corresponding to a Z-quad position in the un-rotated orientation. Address logic 902 can manipulate these address bits to determine the corresponding positions in the three rotated orientations. In particular, address logic 902 can use the above-described address manipulation technique to perform the address conversion. The resulting four addresses may be associated with four different quadrants, and address logic 902 can use the four addresses to address ROMs 904A-D by first matching each address to the appropriate ROM.

The output of ROMs 904A-904D may be provided to multiplexer 906, which is controlled here by the two most significant address bits. This way, the four coefficients can be matched up to their respective orientations.

Address logic 952, ROMs 954A-954D, and multiplexer 956 may have any of the features and functionalities of their above-described like-named counterparts. ROMs 954A-954D, however, may store the coefficients that are used to process image data after downscaling. Depending on whether the feature response being processed corresponds to full resolution or downscaled image data, multiplexer 908 may be controlled to select either the top four coefficients or the bottom four coefficients. While only one set of ROMs is shown for reduced-resolution image data, it should be understood that any number of sets may be implemented.

Using the four coefficients from multiplexer 908, accumulator/decision modules 210A-210C can accumulate the detection results for all four rotations concurrently and can make decisions on all four orientations. In these embodiments, accumulator/decision modules 210A-210C may be implemented like in FIG. 7, but with additional threshold comparators, weight modules, and accumulators, etc. to handle four decisions instead of one. Using this approach, additional coefficient memories may not be needed, and therefore this approach may minimize area usage. This may enable detector 200 to be implemented in an image sensor chip (e.g., image sensor 110 of FIG. 1).

In conclusion, systems and methods are disclosed for detecting objects from an object class, such as faces. In some embodiments, image data (e.g., pixels) can be stored in an image buffer in raster order. The image data may be scanned from, for example, a CMOS or CCD array of sensor cells. The image data may be read out of the image buffer in Z-order. This way, groups of neighboring pixels can be read out in a sequence, such as a square of four pixels referred to as "Z-quads." Multiple feature responses may be computed for the image data to identify various characteristics (e.g., where the edges are) of the image. Using the feature responses, objects of the object class may be detected.

In some embodiments, a detector is provided for an image sensor. The detector can include a first buffer that stores image data in raster order. The detector can also include an object detection module that is configured to detect the presence of objects in the object from the image data. While the object detection module is processing the image data, the image data may also be processed by a downscale module. The downscale module can downscale the image data by, for example, averaging some of the image data together to form lower-resolution pixels. This way, the object detection module may also perform object detection on the lower-resolution data.

In some embodiments, an apparatus is provided that can reorder pixels of an image, such as from raster order to Z order. The apparatus can be used, for example, in an image sensor, and the pixels may be organized into multiple lines. The apparatus can include a first SAM for storing at least one even line of the image, a second SAM for storing at least one odd line of the image, and a third SAM. The apparatus can also include reorganization logic configured to read a first portion (e.g., two pixels) of the at least one even line and a first portion (e.g., two pixels) of the at least one odd line, and can store the first portions into the third SAM. The reorganization buffer can continue to read portions of the at least one even and odd lines and write them into the third SAM.

In some embodiments, a detector is provided for detecting objects in an object even if the image is rotated. The detector can include an image buffer for storing the image data and a coefficient memory for storing coefficients. The coefficients may be used as predetermined thresholds to determine whether objects are present. The detector can include detection hardware that is configured to select an orientation (e.g., rotated 90 degrees, 180 degrees, or 270 degrees with respect to an un-rotated orientation). The detection hardware can read out sequences of image data and coefficients from the respective memories, where the order of the coefficient sequence is based on the amount of rotation of the selected orientation. The sequence of image data can then be processed using the sequence of coefficients to determine whether there are any objects present in the selected orientation.

In some embodiments, the image data that is read out of the image buffer can correspond to a location in the image in the rotated orientation. That location can be matched to a corresponding coefficient in the coefficient memory, and the object detection can be performed based on the image data-to-coefficient pairing.

In other embodiments of the invention, a coefficient memory is provided, which can be used (for example) to detect objects in multiple orientations in parallel. The coefficient memory can include multiple storage units that store different parts of an image (e.g., four storage units storing different quadrants of an image). Coefficients may be read from the storage units at substantially the same time, and each coefficient may be used for performing face detection in a different orientation.

The described embodiments of the invention are presented for the purpose of illustration and not of limitation, and the invention is only limited by the claims which follow.

What is claimed is:

1. A method of detecting an object from an object class for use in an image sensor, the method comprising:
  storing, in an image buffer, image data in raster order;
  reading the image data from the image buffer in Z-order;
  computing a plurality of feature responses for the image data, wherein each of the feature responses corresponds to one of a plurality of features;
  determining whether an object from the object class is present in the image data based on the feature responses; and
  wherein the reading comprises obtaining a group of pixels from the image buffer substantially concurrently, and wherein computing the plurality of feature responses comprises computing one feature response for each of the plurality of features.

2. The method of claim 1, wherein the image buffer comprises at least one random access memory, and wherein the reading comprises:
converting an address vector from a raster order addressing scheme to a Z-order addressing scheme; and
addressing the image buffer using the converted address vector.

3. The method of claim 1, wherein the image buffer comprises at least one sequentially accessed memory, and wherein the reading comprises:
re-writing the image buffer with the image data stored in Z-order; and
sequentially reading the image data from the re-written image buffer.

4. The method of claim 1, wherein the plurality of features comprises lighting contrast characteristics in the vertical, horizontal, and diagonal directions.

5. A method of detecting an object from an object class for use in an image sensor, the method comprising:
storing, in an image buffer, image data in raster order;
reading the image data from the image buffer in Z-order;
computing a plurality of feature responses for the image data, wherein each of the feature responses corresponds to one of a plurality of features;
determining whether an object from the object class is present in the image data based on the feature responses; and
wherein the determining comprises for each of the plurality of feature responses, comparing the feature response to two threshold coefficients to determine whether the feature response increases or decreases the likelihood that an object of the object class is present.

6. The method of claim 5, wherein the determining further comprises:
weighting a result of each of the comparisons using a weight coefficient.

7. A detector for an image sensor, the detector comprising:
a first buffer for storing image data in raster order;
an object detection module configured to detect for the presence of objects in an object class from the image data;
a downscale module configured to downscale the image data;
control logic configured to:
read the image data from the first buffer in Z order; and
provide the image data to the object detection module and the downscale module substantially concurrently; and
wherein the object detection module comprises:
a plurality of feature response calculators configured to compute feature responses from the image data; and a plurality of accumulator/decision modules configured to use the feature responses to determine whether an object of the object class is likely present.

8. The detector of claim 7, wherein the object class comprises faces.

9. The detector of claim 7, wherein the downscale module receives a group of pixels from the first buffer substantially concurrently, and wherein the downscale module is configured to average the group of pixels.

10. The detector of claim 7, further comprising:
a second buffer for storing the downscaled image data, wherein the control logic is further configured to provide the downscaled image data to the object detection module.

11. The detector of claim 10, wherein the downscale module is further configured to downscale the downscaled pixels while the object detection module performs object detection on the downscaled pixels.

12. The detector of claim 7, where at least one of the accumulator/decision modules comprises: a threshold memory that stores a plurality of pairs of threshold coefficients; a weight memory that stores a plurality of weight coefficients.

13. The detector of claim 12, wherein the at least one of the accumulator/decision modules is configured to:
obtain one of the feature responses from one of the feature response calculators;
select one of the pairs of threshold coefficients from the threshold memory;
select one of the weight coefficients from the weight memory;
generate a likelihood value based on whether the one of the feature responses falls between the selected pair of threshold coefficients; and
multiply the likelihood value by the selected weight coefficient.

14. A detector for detecting objects of an object class for use in an image sensor, the detector comprising:
an image buffer for storing image data, wherein the image data forms at least part of an image;
a coefficient memory for storing a plurality of coefficients;
detection hardware configured to:
select a first orientation to use in detecting objects of the object class;
read out a sequence of image data from the image buffer;
read out a first sequence of coefficients from the coefficient memory, wherein an order of the first sequence is determined based on the selected first orientation; and
process the sequence of image data using the first sequence of coefficients to determine whether one or more objects in the first orientation are present in the at least part of the image.

15. The detector of claim 14, wherein the detection hardware is further configured to:
select a second orientation to use in detecting objects of the object class;
read out a second sequence of coefficients from the coefficient memory, wherein an order of the second sequence is determined based on the selected second orientation; and
process the sequence of image data using the second sequence of coefficients.

16. The detector of claim 15, wherein the first orientation is rotated 90 degrees, 180 degrees, or 270 degrees with respect to the second orientation.

17. The detector of claim 14, wherein the sequence of image data is read out in Z order.

18. The detector of claim 14, wherein the detection hardware processes the sequence of image data by:
computing a feature response for each element in the sequence of image data; and
pairing each feature response to a corresponding coefficient in the first sequence of coefficients.

19. A method of detecting an objects of an object class in an image using an image sensor, wherein the object is rotated with respect to an un-rotated orientation, and wherein the image sensor comprises a coefficient memory for storing a plurality of coefficients, the method comprising:

computing a feature response associated with a location in the image in the rotated orientation;

matching the location in the image to at least one coefficient in the coefficient memory;

reading the at least one coefficient from the coefficient memory; and identifying whether an object of the object class is present in the rotated orientation based on the feature response and the at least one coefficient; and wherein the matching comprises computing an address vector for addressing the coefficient memory, and wherein the address vector is computed based on an amount of rotation of the rotated orientation with respect to the un-rotated orientation.

20. The method of claim 19, wherein the amount of rotation is one of 90 degrees, 180 degrees, and 270 degrees from the un-rotated orientation.

21. The method of claim 19, wherein the coefficient memory stores the coefficients in a sequence corresponding to the un-rotated orientation, and wherein the matching comprises converting a first address vector associated with the un-rotated orientation to a second address vector associated with the rotated orientation.

22. The method of claim 19, wherein the reading the at least one coefficient comprises reading a pair of threshold coefficients, and wherein the identifying comprises comparing the feature response to the pair of thresholds.

23. The method of claim 19, wherein the reading the at least one coefficient comprises reading a weight coefficient, and wherein the identifying comprises multiplying a value that is computed based on the feature response with the weight coefficient.

24. A coefficient memory for storing coefficients for use in detecting objects in an image sensor, the memory comprising:

a first storage unit for storing a first plurality of coefficients associated with a first portion of an image;

a second storage unit for storing a second plurality of coefficients associated with a second portion of the image; and address logic configured to:

compute first and second address vectors;

address the first storage unit using the first address vector to provide a first coefficient; and address the second storage unit using the second address vector to provide a second coefficient substantially concurrently with the first coefficient.

25. The coefficient memory of claim 24, wherein the first address vector is associated with a first orientation of the image, and wherein the second address vector is associated with a second orientation of the image.

26. The coefficient memory of claim 24, further comprising:

a third storage unit for storing a third plurality of coefficients, wherein the third plurality of coefficients is associated with a lower-resolution version of the first portion of the image; and a fourth storage unit for storing a fourth plurality of coefficients, wherein the fourth plurality of coefficients is associated with a lower-resolution version of the second portion of the image.

27. The coefficient memory of claim 26, wherein the address logic is further configured to:

compute third and fourth address vectors;

address the third storage unit using the third address vector to provide a third coefficient; and address the fourth storage unit using the fourth address vector to provide a fourth coefficient substantially concurrently with the third coefficient.

28. The coefficient memory of claim 27, further comprising:

selection logic configured to select the first and second coefficients or the third and fourth coefficients for use in detecting objects of the object class.

* * * * *